(12) United States Patent
Ganzel

(10) Patent No.: US 12,709,255 B2
(45) Date of Patent: Aug. 18, 2026

(54) BRAKE SYSTEMS WITH MASTER CYLINDERS AND SINGLE CORNER ACTUATORS

(71) Applicant: ZF Active Safety US Inc., Livonia, MI (US)

(72) Inventor: Blaise J. Ganzel, Ann Arbor, MI (US)

(73) Assignee: ZF ACTIVE SAFETY US INC., Livonia, MI (US)

( * ) Notice: Subject to any disclaimer, the term of this patent is extended or adjusted under 35 U.S.C. 154(b) by 408 days.

(21) Appl. No.: 18/447,490

(22) Filed: Aug. 10, 2023

(65) Prior Publication Data

US 2024/0294152 A1 Sep. 5, 2024

Related U.S. Application Data

(60) Provisional application No. 63/450,461, filed on Mar. 7, 2023, provisional application No. 63/449,670, filed
(Continued)

(51) Int. Cl.
*B60T 8/40* (2006.01)
*B60T 13/14* (2006.01)
*B60T 13/66* (2006.01)

(52) U.S. Cl.
CPC .......... *B60T 8/4081* (2013.01); *B60T 13/147* (2013.01); *B60T 13/662* (2013.01); *B60T 2270/402* (2013.01)

(58) Field of Classification Search
CPC ...... G05D 16/204; H02K 7/10; H02K 11/215; H05K 7/1432; B60T 7/042; B60T 8/17;
(Continued)

(56) References Cited

U.S. PATENT DOCUMENTS 10,730,501 B2 8/2020 Ganzel
2013/0270895 A1* 10/2013 Nishioka .............. B60T 13/161 303/14
(Continued)

FOREIGN PATENT DOCUMENTS

DE 4413579 A1 10/1995
DE 102017212360 A1 1/2019
(Continued)

OTHER PUBLICATIONS

Search Report for corresponding German Application Serial No. 10 2024 201 684.5, dated Oct. 23, 2024, pp. 1-8.

*Primary Examiner* — Robert A. Siconolfi
*Assistant Examiner* — San M Aung
(74) *Attorney, Agent, or Firm* — Tarolli, Sundheim, Covell & Tummino LLP

(57) ABSTRACT

A brake system for actuating a plurality of wheel brakes includes a reservoir and a master cylinder operable during a backup braking mode to generate pressurized hydraulic fluid for hydraulically actuating the wheel brakes, responsive to user manipulation of a brake pedal mechanically connected to the master cylinder. A plurality of single corner actuators is each hydraulically interposed between the master cylinder and a corresponding wheel brake. Each single corner actuator includes a SCA power transmission unit for actuating the respective wheel brake in at least one of a normal non-failure braking mode and a backup braking mode. At least one normally open iso valve is interposed hydraulically between the plunger assembly and the respective first or second MC output for selectively controlling provision of hydraulic fluid to the respective wheel brake from at least one of the plunger assembly and the master cylinder.

24 Claims, 3 Drawing Sheets

Related U.S. Application Data on Mar. 3, 2023, provisional application No. 63/449,464, filed on Mar. 2, 2023.

(58) Field of Classification Search

CPC ...... B60T 8/176; B60T 8/4081; B60T 13/147; B60T 13/148; B60T 13/168; B60T 13/588; B60T 13/662; B60T 13/686; B60T 13/745; B60T 13/746; B60T 15/028; B60T 17/221; B60T 2270/82; B60T 2270/402; B60T 2270/404; B60T 2270/406

USPC ........................................................ 303/113.4

See application file for complete search history.

(56) References Cited

U.S. PATENT DOCUMENTS

| | | | | |
|---|---|---|---|---|
| 2015/0097416 | A1* | 4/2015 | Ueura | B60T 7/042 303/3 |
| 2016/0159332 | A1* | 6/2016 | Yang | B60T 8/4018 303/15 |
| 2018/0334149 | A1* | 11/2018 | Feigel | B60T 13/745 |
| 2019/0248348 | A1* | 8/2019 | Ganzel | B60T 13/745 |
| 2019/0275997 | A1* | 9/2019 | Park | B60T 13/18 |
| 2020/0216055 | A1* | 7/2020 | Lee | B60T 13/745 |
| 2020/0307538 | A1 | 10/2020 | Ganzel | |
| 2022/0274576 | A1* | 9/2022 | Ganzel | H02K 11/215 |
| 2023/0048177 | A1* | 2/2023 | Ganzel | B60T 7/042 |
| 2023/0048447 | A1 | 2/2023 | Ganzel | |

FOREIGN PATENT DOCUMENTS

| | | | |
|---|---|---|---|
| DE | 102022201771 | A1 | 9/2022 |
| DE | 102022208245 | A1 | 2/2023 |
| DE | 102022212929 | A1 | 6/2023 |
| DE | 102022212932 | A1 | 6/2023 |

* cited by examiner

BRAKE SYSTEMS WITH MASTER CYLINDERS AND SINGLE CORNER ACTUATORS

RELATED APPLICATION

This application claims priority from U.S. Provisional Application No. 63/450,461 filed 7 Mar. 2023, from U.S. Provisional Application No. 63/449,670 filed 3 Mar. 2023, and from U.S. Provisional Application No. 63/449,464 filed 2 Mar. 2023, the subject matter of all of which is incorporated herein by reference in its entirety, for all purposes.

This application is related to the technologies disclosed in one or more of U.S. Provisional Patent Application No. 63/518,687, filed concurrently herewith and titled "PUSH THRU SCA"; U.S. patent application Ser. No. 18/447,541, filed concurrently herewith and titled "Brake Systems with Motor-Driven Master Cylinders and Electric Secondary Power Transmission Units"; U.S. patent application Ser. No. 18/447,566, filed concurrently herewith and titled "Brake Systems with Motor-Driven Master Cylinders and Wheel-Side Pressure Sensors"; U.S. patent application Ser. No. 18/447,609, filed concurrently herewith and titled "Venting Valve and Brake Systems Using Same"; and U.S. patent application Ser. No. 18/447,642, filed concurrently herewith and titled "Bleed Valve and Brake Systems Using Same"; the entire contents of all of which are incorporated herein by reference for all purposes.

TECHNICAL FIELD

This disclosure relates to an apparatus and method for use of brake systems with master cylinders and single-corner actuators, and, more particularly, to methods and apparatus of brake systems having pedal simulators and in which brake pedals are mechanically connected to the master cylinders.

BACKGROUND

A brake system may include anti-lock control including a hydraulic braking pressure generator, a braking pressure modulator which is provided in the pressure fluid conduits between the braking pressure generator and the wheel brakes and which serves to vary the braking pressure by changing the volume of a chamber containing the hydraulic fluid, sensors for determining the wheel rotational behavior, and electronic circuits for processing the sensor signals and for generating braking-pressure control signals. Brake systems may also include both anti-lock control and traction slip control, which can use braking pressure modulators for controlled vehicular braking.

Descriptions of prior art brake systems are in U.S. Pat. No. 10,730,501, issued 4 Aug. 2020 to Blaise Ganzel and titled "Vehicle Brake System with Auxiliary Pressure Source", in U.S. Patent Application Publication No. 2020/0307538, published 1 Oct. 2020 by Blaise Ganzel and titled "Brake System with Multiple Pressure Sources", and in U.S. patent application Ser. No. 17/400,250, filed 12 Aug. 2021 by Blaise Ganzel and titled "Apparatus and Method for Control of a Hydraulic Brake System Including Manual Pushthrough", all of which are incorporated herein by reference in their entirety for all purposes.

SUMMARY

In an aspect, alone or in combination with any other aspect, a brake system for actuating a plurality of wheel brakes comprising at least first and second wheel brakes is described. The brake system comprises a reservoir and a master cylinder in fluid communication with the reservoir and operable during a backup braking mode to generate pressurized hydraulic fluid at first and second MC outputs for hydraulically actuating the first and second wheel brakes, respectively, responsive to user manipulation of a brake pedal mechanically connected to the master cylinder. The master cylinder is a dual chamber type master cylinder. A brake simulator is in fluid communication with at least a selected one of the first and second MC outputs and with the reservoir for providing predetermined brake pedal response to the user. A plurality of single corner actuators is provided. Each single corner actuator is hydraulically interposed between a selected one of the first and second MC outputs and a corresponding one of the first and second wheel brakes. Each single corner actuator includes a SCA power transmission unit configured for selectively providing pressurized hydraulic fluid at an SCA output for actuating the respective wheel brake in at least one of a normal non-failure braking mode and a backup braking mode. The SCA power transmission unit includes an electric PTU motor configured to selectively pressurize the hydraulic fluid by transmitting rotary motion to a plunger assembly of the SCA power transmission unit. At least one normally open iso valve is interposed hydraulically between the plunger assembly and the respective first or second MC output for selectively controlling provision of hydraulic fluid to the respective wheel brake from at least one of the plunger assembly and the master cylinder. A check valve is interposed hydraulically between the respective first or second MC output and the SCA power transmission unit. A cracking pressure of the check valve permits pressure release from the SCA power transmission unit due to a predetermined amount of thermal expansion. At least two brake pressure sensors are provided. Each brake pressure sensor is associated with a corresponding wheel brake for sensing hydraulic pressure and responsively producing a brake pressure signal. An electronic control unit is provided for controlling at least one SCA power transmission unit responsive to at least one brake pressure signal. Each single corner actuator is indirectly fluidly connected to the reservoir via the master cylinder.

In an aspect, alone or in combination with any other aspect, a brake system for actuating a plurality of wheel brakes comprising at least first and second wheel brakes is provided. The brake system comprises a reservoir and a master cylinder in fluid communication with the reservoir and operable during backup braking mode to generate pressurized hydraulic fluid at first and second MC outputs for hydraulically actuating the first and second wheel brakes, respectively, responsive to user manipulation of a brake pedal mechanically connected to the master cylinder. The master cylinder is a dual chamber type master cylinder. A brake simulator is in fluid communication with at least a selected one of the first and second MC outputs and with the reservoir for providing predetermined brake pedal response to the user. A plurality of single corner actuators is provided. Each single corner actuator is hydraulically interposed between a selected one of the first and second MC outputs and a corresponding one of the first and second wheel brakes. Each single corner actuator includes a SCA power transmission unit configured for selectively providing pressurized hydraulic fluid at an SCA output for actuating the respective wheel brake in at least one of a normal non-failure braking mode and a backup braking mode. The SCA power transmission unit includes an electric PTU motor configured to selectively pressurize the hydraulic fluid by transmitting rotary motion to a plunger assembly of the SCA power transmission unit. At least one two-position three-way valve is interposed hydraulically between the plunger assembly and the respective wheel brake for selectively controlling provision of hydraulic fluid to the respective wheel brake from at least one of the plunger assembly and the master cylinder. A check valve is interposed hydraulically between the respective first or second MC output and the SCA power transmission unit. A cracking pressure of the check valve permits pressure release from the SCA power transmission unit due to a predetermined amount of thermal expansion. At least two brake pressure sensors are provided. Each brake pressure sensor is associated with a corresponding wheel brake for sensing hydraulic pressure and responsively producing a brake pressure signal. An electronic control unit is provided for controlling at least one of the three-way valves and the at least one SCA power transmission unit responsive to at least one brake pressure signal. Each single corner actuator is indirectly fluidly connected to the reservoir via the master cylinder.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

Figure 1:
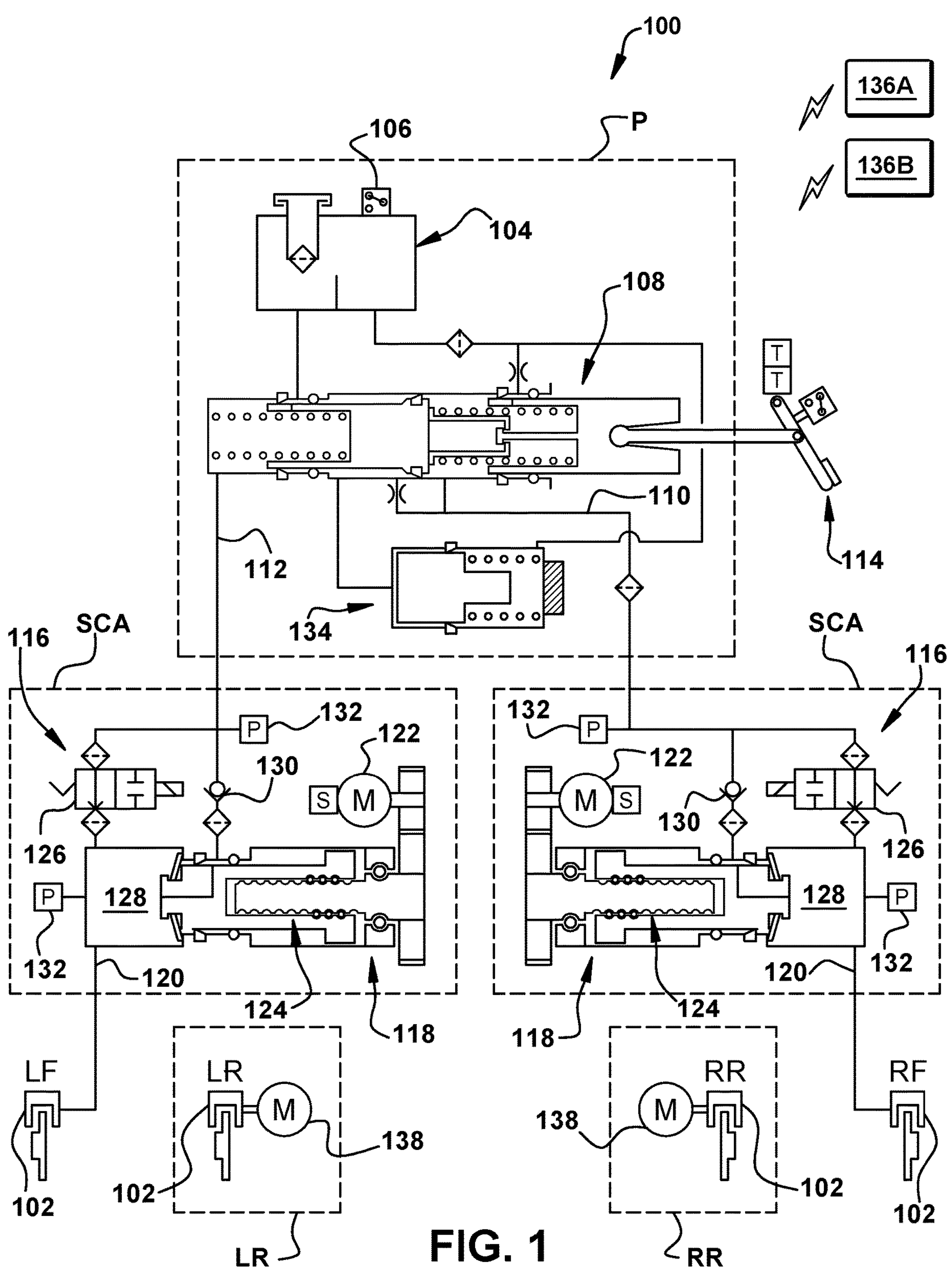
FIG. 1 is a schematic hydraulic diagram of an example brake system according to an aspect of the present invention.

FIG. 1 schematically depicts a first configuration of an example brake system 100 for actuating a plurality of wheel brakes 102, such as first and second wheel brakes LF and RF, as shown. The brake system 100 is shown here as a hydraulic braking system, in which fluid pressure is utilized to apply braking forces for the brake system 100. The brake system 100 may suitably be used on a ground vehicle, such as an automotive vehicle having four wheels with a wheel brake associated with each wheel. Furthermore, the brake system 100 can be provided with other braking functions such as anti-lock braking (ABS) and other slip control features to effectively brake the vehicle. Components of the brake system 100 may be housed in one or more blocks or housings. The blocks or housings may be made from solid material, such as aluminum, that has been drilled, machined, or otherwise formed to house the various components. Fluid conduits may also be formed in the block or housing.

In the illustrated embodiments of the brake system 100, there are four wheel brakes 102, which each can have any suitable wheel brake structure operated electrically and/or by the application of pressurized brake fluid. Each of the wheel brakes 102 may include, for example, a brake caliper mounted on the vehicle to engage a frictional element (such as a brake disc) that rotates with a vehicle wheel to effect braking of the associated vehicle wheel. The wheel brakes 102 can be associated with any combination of front and rear wheels of the vehicle in which the corresponding brake system 100 is installed. For example, the brake system 100 may be configured as a vertically split or diagonally split system. No differentiation is made herein among the wheel brakes 102, for the purposes of this description, though one of ordinary skill in the art could readily provide a suitable braking arrangement for a particular use environment.

The brake system 100 also includes a fluid reservoir 104. The reservoir 104 stores and holds hydraulic fluid for the brake system 100. The fluid within the reservoir 104 is preferably held at or about atmospheric pressure, but the fluid may be stored at other pressures if desired. The reservoir 104 is shown schematically having two tanks or sections with fluid conduit lines connected thereto. The sections can be separated by several interior walls within the reservoir 104 and are provided to prevent complete drainage of the reservoir 104 in case one of the sections is depleted due to a leakage via one of the lines connected to the reservoir 104. Any number of lines could be connected to the reservoir 104, and one of ordinary skill in the art can readily provide a suitably configured reservoir 104 for a particular use environment. Alternatively, the reservoir 104 may include multiple separate housings. The reservoir 104 may include at least one fluid level sensor 106 for detecting the fluid level of one or more of the sections of the reservoir 104.

A manually operable master cylinder 108 is in fluid communication with the reservoir 104 and is operable during a backup braking mode to generate pressurized hydraulic fluid at first and second MC outputs 110 and 112, respectively, for hydraulically actuating the first and second wheel brakes LF and RF, respectively. This backup braking mode is termed “manual push-through” and can result in the provision of pressurized hydraulic fluid in a known manner when other portions of the brake system 100 are not available for use for some reason. The master cylinder (“MC”) 108 shown in the Figures is a dual-chamber type master cylinder and is operable to generate pressurized fluid responsive to user manipulation (manual force) of a brake pedal 114 mechanically connected to the master cylinder 108. As shown, the master cylinder 108 is a dual-chamber type master cylinder.

The brake system 100 also includes a plurality of single corner actuators (“SCA”) 116. Each single corner actuator 116 is hydraulically interposed between a selected one of the first and second MC outputs 110 and 112 and a corresponding one of the first and second wheel brakes RF and LF. Each SCA 116 includes a SCA power transmission unit (“PTU”) 118 configured for selectively providing pressurized hydraulic fluid at an SCA output 120 for actuating the respective wheel brake in at least one of a normal non-failure braking mode and a backup braking mode, though it is contemplated that the SCA 116 will normally be used to provide pressurized hydraulic fluid to a corresponding wheel brake 102 in the normal non-failure braking mode. The secondary PTU 118 includes an electric PTU motor 122 configured to selectively pressurize the hydraulic fluid by transmitting rotary motion to a plunger assembly 124 of the secondary PTU 118. Each single corner actuator 116 may be indirectly fluidly connected to the reservoir 104 via the master cylinder 108.

In the brake system 100 shown in FIG. 1, each single corner actuator 116 includes at least one normally open iso valve 126 interposed hydraulically between the plunger assembly 124 and the respective first or second MC output 110 or 112 for selectively controlling provision of hydraulic fluid to the respective wheel brake 102 from at least one of the plunger assembly 124 and the master cylinder 108. (It should be noted that the normally open iso valve 126 will not prevent fluid transfer into the plunger assembly 124, in many use environments.) The normally open iso valve 126 allows flow of pressurized hydraulic fluid to a plunger cavity 128 of the single corner actuator 116—and thus indirectly to the respective wheel brake 102—from the master cylinder 108 when the iso valve 126 is de-energized (e.g., when the brake system 100 is in a backup braking mode, such as when the single corner actuator 116 is not operating. However, the iso valve 126 can be closed (e.g., when the brake system 100 is in a normal non-failure braking mode) to allow the plunger assembly 125 of the single corner actuator 116 to build pressure and thus directly supply pressurized hydraulic fluid to the wheel brake 102.

A check valve 130 of the single corner actuator 116 may be interposed hydraulically between the respective first or second MC output 110 or 112 and the SCA power transmission unit 118. A cracking pressure of the check valve 130, when present, may selectively permit pressure release from the SCA power transmission unit 118 back toward the master cylinder 108 (and thus indirectly toward the reservoir 104) for any desired reason such as, but not limited to, due to development of a predetermined amount of thermal expansion in the secondary PTU 118.

At least two brake pressure sensors 132 may be provided to the brake system 100, with each brake pressure sensor 132 being optionally located directly hydraulically adjacent a corresponding wheel brake RF or LF for sensing hydraulic pressure at the corresponding wheel brake RF or LF and responsively producing a brake pressure signal.

A brake simulator (shown generally at 134) may be provided in hydraulic connection to the master cylinder 108 (i.e., with at least a selected one of the first and second MC outputs 110 and 112) and directly or indirectly to the reservoir 104 for providing desired brake pedal response, assisting with routing hydraulic fluid between other components of the brake system 100, or for any other reason. One of ordinary skill in the art can readily configure a suitable brake simulator 134 for a particular use environment.

At least one electronic control unit ("ECU") 136 may be provided for controlling at least one of the SCA power transmission units 118 and at least one of the normally open iso valves 126 responsive to at least one brake pressure signal, with first and second ECUs 136A, 136B being shown and described herein. The ECUs 136A, 136B may include microprocessors and other electrical circuitry. The ECUs 136A, 136B receive various signals, process signals, and control the operation of various electrical components of a corresponding brake system 100 in response to the received signals, in a wired and/or wireless manner. For example, the ECU(s) 136A and/or 136B may control at least one of the SCA power transmission units 118 and the iso valves 126 responsive to the braking signal generated by the brake pedal 114.

The ECUs 136A, 136B can be connected to various sensors such as the reservoir fluid level sensor 106, pressure sensors, travel sensors, switches, wheel speed sensors, and steering angle sensors. The ECUs 136A, 136B may also be connected to an external module (not shown) for receiving information related to yaw rate, lateral acceleration, longitudinal acceleration of the vehicle, or other characteristics of vehicle operation for any reason, such as, but not limited to, controlling the brake system 100 during vehicle braking, stability operation, or other modes of operation. Additionally, the ECUs 136A, 136B may be connected to the instrument cluster for collecting and supplying information related to warning indicators such as an ABS warning light, a brake fluid level warning light, and a traction control/vehicle stability control indicator light. It is contemplated that at least one of the ECUs 136A and 136B may be, for example, integrated into at least one of the secondary PTUs 118.

When there are two ECUs provided to the brake system 100, the first ECU 136A may be operative to control the electric PTU motor 126 of at least one selected SCA 116, and/or any desired one(s) of the valves (e.g., iso valve[s] 126) of the brake system 100. The second ECU 136B may be operative to control the electric PTU motor 126 of at least one other SCA 116, and/or any desired one(s) of the valves (e.g., iso valve[s] 126) of the brake system 100. For example, the first ECU 136A may control at least a selected one of the normally open iso valves 126 and the second ECU 136B may control the at least one SCA power transmission unit 118 (and optionally at least an other one of the normally open iso valves 126), wherein both the first and second ECUs 136A, 136N control their respective normally open iso valve 126 and the at least one SCA power transmission unit 118 responsive to at least one brake pressure signal. One of ordinary skill in the art can readily provide a suitable ECU 136 control arrangement to achieve desired redundancy and backup functions for a particular use environment of the brake systems 100 shown and described herein.

An example of a suitable ECU 136 arrangement is disclosed in co-pending U.S. patent application Ser. No. 17/708,019, filed concurrently herewith and titled "Control Arrangement for a Brake System", hereafter referenced as "the backed-up ECU"), which is incorporated by reference herein in its entirety for all purposes.

Each of the single corner actuators 116 may be carried by a respective SCA housing, which is depicted schematically by dashed lines "SCA" in the Figures. The reservoir 104 and master cylinder 108 may be collectively carried by a primary housing, which is depicted schematically by dashed line "P" in the Figures. The primary housing and each SCA housing may all be spaced mutually apart from one another. It is contemplated that each SCA housing may be located immediately adjacent a corresponding wheel brake RF or LF, as desired.

The brake system 100 may include third and fourth wheel brakes 102, labeled as LR and RR, respectively. Each of the third and fourth wheel brakes LR and RR may be actuated by at least one of an electric brake motor 138 and an additional, separately provided single corner actuator (not shown, but substantially similar to the SCAs 116 discussed above and shown as associated with the first and second wheel brakes LF and RF in the Figures. The third and fourth wheel brakes LR and RR, and/or their associated electric brake motor 138 and/or single corner actuator(s) may be housed in separate rear brake housings (depicted schematically by dashed lines "RB" in FIGS. 2 and 4), which may be spaced apart from the primary housing and each SCA housing.

Figure 2:
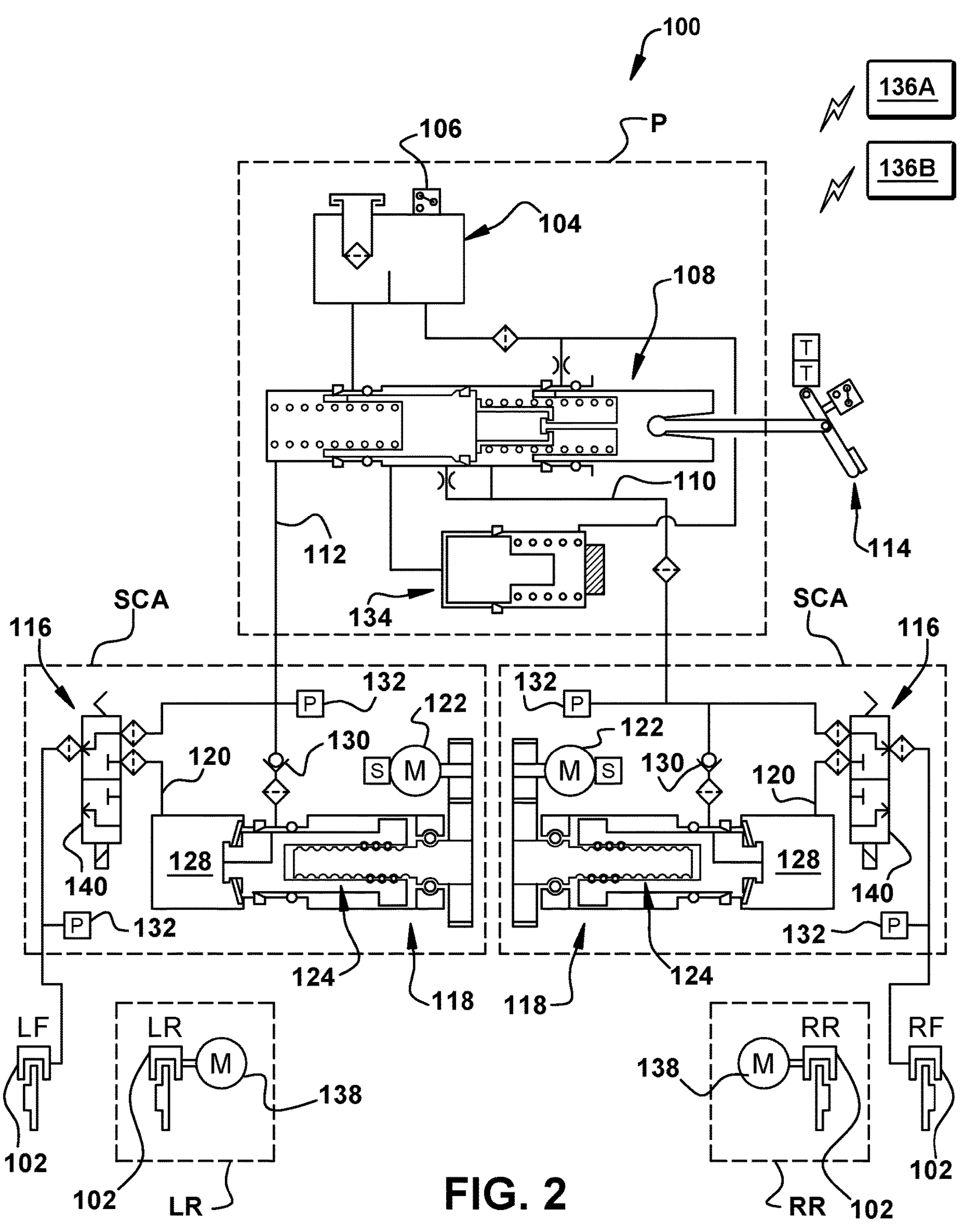
FIG. 2 is a schematic hydraulic diagram of the example brake system of FIG. 1 in a first alternate configuration.

FIG. 2 illustrates the brake system 100 in a first alternate configuration. The brake system 100 of FIG. 2 is similar to the brake system 100 of FIG. 1 and therefore, structures of FIG. 2 that are the same as or similar to those described with reference to FIG. 1 have the same reference numbers. Description of common elements and operation similar to those in the previously described configuration will not be repeated with respect to the brake system 100 of FIG. 2, but should instead be considered to be incorporated below by reference as appropriate.

Figure 3:
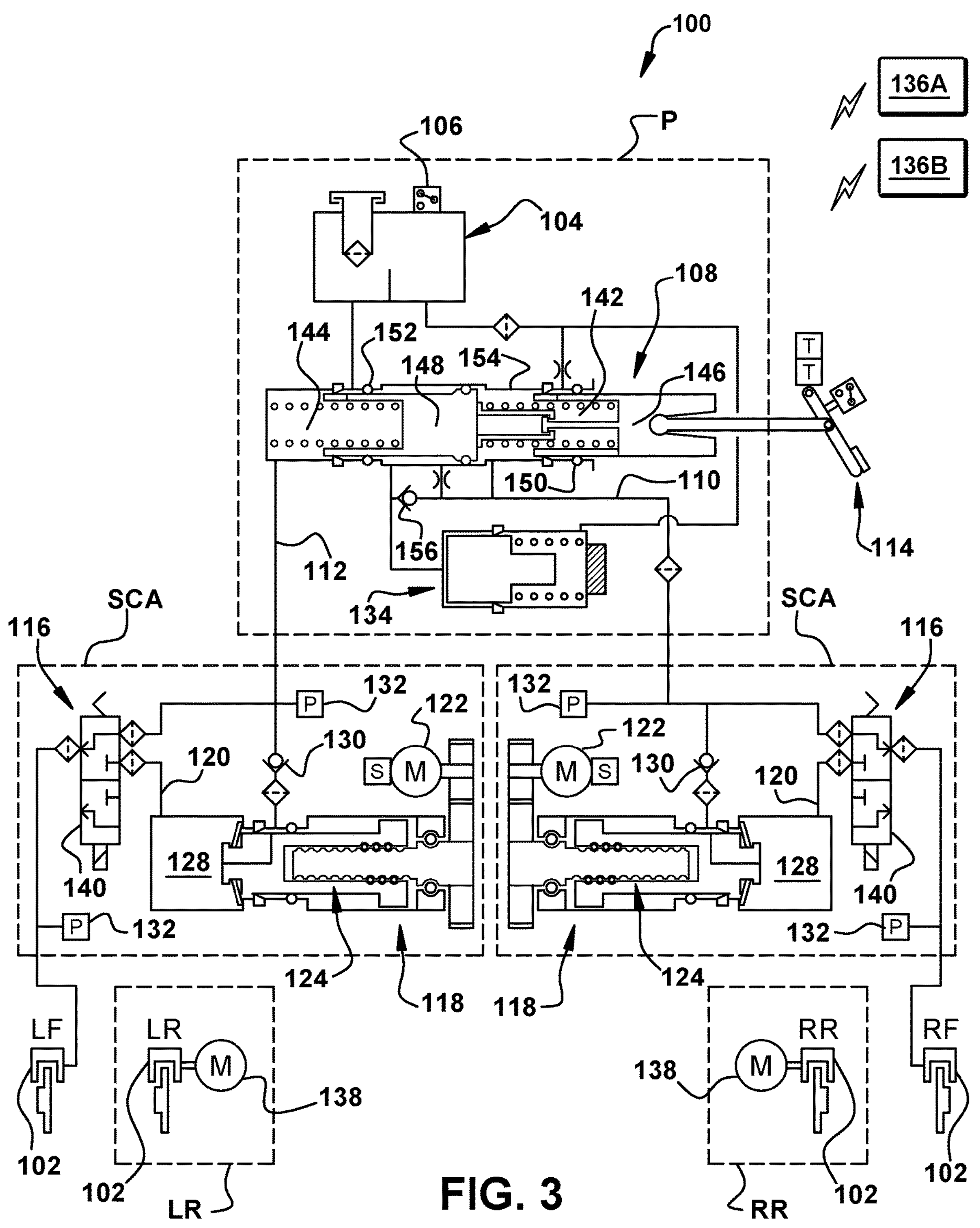
FIG. 3 is a schematic hydraulic diagram of the example brake system of FIG. 1 in a second alternate configuration.

At least one two-position three-way valve 140 is included in the SCA 116 of FIGS. 2-3, as opposed to the iso valve 126 of FIG. 1. The three-way valves 140 of the brake systems 100 of FIGS. 2-3 may each be interposed hydraulically between the plunger assembly 124 and the respective wheel brake LF or RF of that SCA 116 for selectively controlling provision of hydraulic fluid to the respective wheel brake LF or RF from at least one of the plunger assembly 124 and the master cylinder 108. For example, and as shown in FIGS. 2-3, the three-way valve 140 may be operative to route pressurized hydraulic fluid from the MC 108 (via corresponding first or second MC output 110 or 112) to the respective wheel brake LF or RF when the three-way valve 140 is de-energized, if such routing is desired. For example, the three-way valves 140 of FIGS. 2-3 may be operative to switch a source of pressurized fluid for the corresponding wheel brake 102 from the corresponding single corner actuator 116 to the corresponding first or second MC output 110 or 112 responsive to a loss of electrical power in the brake system 100. The three-way valve 140 can be energized to route pressurized hydraulic fluid from the secondary PTU 118 (via corresponding SCA output 120) to the respective wheel brake LF or RF, such as during the normal non-failure braking mode.

Due to the configuration of the brake system 100 shown in FIG. 2, the SCA 116 is desirably in a powered state during an evac/fill process during manufacture, repair, and/or maintenance. Likewise during evac/fill, the three-way valve 140 could be pulse-width modulated in order to open both of the flow paths sufficiently for efficient and quick filling of the brake system 100 with hydraulic fluid.

The three-way valve 140 at the SCA 118 of the brake systems 100 of FIGS. 2-3 may help facilitate manual push-through from the master cylinder 108 without sudden pedal travel (which could cause user discomfort or concern) if the brake system 100 loses electrical power. The SCA 118 will be "cut off" if there is such an electrical failure during boosted braking, and hydraulic resistance remaining within the de-energized brake system can cause the backup braking mode brake pedal 114 interaction to feel, to the user, more like a normal non-failure mode brake pedal 114 interaction.

FIG. 3 illustrates the brake system 100 in a second alternate configuration. The brake system 100 of FIG. 3 is similar to the brake systems 100 of FIGS. 1-2 and therefore, structures of FIG. 3 that are the same as or similar to those described with reference to FIGS. 1-2 have the same reference numbers. Description of common elements and operation similar to those in the previously described configurations will not be repeated with respect to the brake system 100 of FIG. 3, but should instead be considered to be incorporated below by reference as appropriate.

Some example details of the master cylinder 108 construction will be discussed with respect to the version shown in FIG. 3. However, the master cylinder of FIG. 3 may have some commonalities with the master cylinders of FIGS. 1-2. Additionally, where there are differences, it is contemplated that—as with a plurality of components and features of the brake systems 100 shown and described herein—the master cylinder version of FIG. 3 could be used instead in any of the brake systems 100 of FIGS. 1-2, and vice versa. One of ordinary skill in the art can readily configure a brake system 100 of any example configuration—whether or not shown in the Figures—to include a master cylinder 108 having the characteristics of any of the other example configurations, or having any other suitable arrangement.

As shown in the Figures, the master cylinder 108 includes first and second MC chambers 142 and 144, respectively, and corresponding first and second MC plungers 146 and 148 configured for reciprocal motion therein. The first and second MC chambers 142 and 144 each provide pressurized hydraulic fluid at a corresponding first or second MC output 110 and 112. The outer circumference of each of the first and second MC plungers 146 and 148 may include a sealing groove (multiple shown schematically and one labeled as 150). When present, the sealing groove 150 may include a resilient sealing member (multiple shown schematically and one labeled as 152) for preventing fluid flow therepast when the resilient sealing member 152 is in contact with an inner wall of an MC housing (shown schematically at 154). At least one resilient sealing member 152 may have a cross-sectional shape which is at least one of curved, ovoid, and circular, to prevent fluid flow in both directions therepast. It is also contemplated that at least one resilient sealing member 152 (which may be an other resilient sealing member 152) may have a cross-sectional shape which is at least one of asymmetrical, rectilinear, or curvilinear, similar to that of a recup seal or a lip seal.

As shown explicitly in the brake system 100 of FIG. 3, but equally configurable for the brake systems 100 of FIGS. 1-2, the first and second MC plungers 146 and 148 may each have substantially the same outer circumference size. The outer circumference size of the first and second MC plungers 146 and 148 may affect the pressure balance between the two wheel brakes 102 receiving pressurized hydraulic fluid from the first and second MC outputs 110 and 112—here, for example, facilitating primary pressure in the system to be higher for a predetermined brake pedal force than if the outer circumferences were different. The MC housing 154 may have a "stepped", or variable-circumference, outer profile to facilitate the matching of the outer circumference sizes.

It should also be noted that the rightmost (in the orientation of FIG. 3) resilient sealing member 152 of the second MC plunger 148 as shown in FIG. 3 has a substantially circular cross-section to resist fluid flow therepast in both directions, unlike the lip seal type asymmetrical resilient sealing members at the corresponding positions in the master cylinders 108 shown in FIGS. 1-2, which each will allow a predetermined amount of hydraulic fluid flow therepast. At least partially as a result of the design of the resilient sealing member 152, less piston travel is needed to close the orifice port. A check valve is provided in parallel to allow fluid to quickly exit the brake pedal simulator.

Finally, with respect to the brake system 100 shown in FIG. 3, a simulator check valve 156 is shown as being interposed hydraulically between the master cylinder 108 and the selected one of the first and second MC outputs 110 or 112 which is associated with the brake simulator 134. When present, the simulator check valve 156 may be operative to control flow of pressurized fluid between two or more of the brake simulator 108, the master cylinder 108, and a corresponding one of the single corner actuators 116 responsive to pressure in the selected one of the firsts and second MC outputs 110 or 112 being at least equal to a predetermined simulator check cracking pressure of the simulator check valve 156. When configured as shown in FIG. 3, the simulator check valve 156 may damp or otherwise restrict hydraulic fluid flow into the brake simulator 134 but facilitate "free" or substantially unimpeded hydraulic fluid flow out of the brake simulator 134 to avoid "pumping up" (stiffening) the brake pedal 114 in a manner which may cause user discomfort or concern.

It is contemplated that various other components, such as electric service and/or parking brake motors, could be provided by one of ordinary skill in the art to achieve desired configurations for particular use environments, in any of the brake systems described herein. For example, while a number of filters and pressure sensors are shown in the Figures, specific description thereof has been omitted herefrom for brevity, as one of ordinary skill in the art will readily understand how to provide a desired number, placement, and/or operation of filters, sensors, and any other components as desired for a particular use environment of the present invention.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A brake system for actuating a plurality of wheel brakes comprising at least first and second wheel brakes, the brake system comprising:

a reservoir;

a master cylinder in fluid communication with the reservoir and operable during a backup braking mode to generate pressurized hydraulic fluid at first and second MC outputs for hydraulically actuating the first and second wheel brakes, respectively, responsive to user manipulation of a brake pedal mechanically connected to the master cylinder, the master cylinder being a dual chamber type master cylinder;

a brake simulator in fluid communication with at least a selected one of the first and second MC outputs and with the reservoir for providing predetermined brake pedal response to the user;

a plurality of single corner actuators, each single corner actuator being hydraulically interposed between a selected one of the first and second MC outputs and a corresponding one of the first and second wheel brakes, each single corner actuator including a SCA power transmission unit configured for selectively providing pressurized hydraulic fluid at an SCA output for actuating the respective wheel brake in at least one of a normal non-failure braking mode and a backup braking mode, the SCA power transmission unit including an electric PTU motor configured to selectively pressurize the hydraulic fluid by transmitting rotary motion to a plunger assembly of the SCA power transmission unit;

at least one normally open iso valve interposed hydraulically between the plunger assembly and the respective first or second MC output for selectively controlling provision of hydraulic fluid to the respective wheel brake from at least one of the plunger assembly and the master cylinder; and a check valve interposed hydraulically between the respective first or second MC output and the SCA power transmission unit, a cracking pressure of the check valve permitting pressure release from the SCA power transmission unit due to a predetermined amount of thermal expansion; and an electronic control unit for controlling at least one SCA power transmission unit responsive to at least one brake pressure signal;

wherein each single corner actuator is indirectly fluidly connected to the reservoir via the master cylinder.

2. The brake system of claim 1, wherein the electronic control unit is a first electronic control unit controlling at least a selected one of the normally open iso valves and the brake system includes a second electronic control unit controlling the at least one SCA power transmission unit, wherein both the first and second electronic control units control the respective normally open iso valve and the at least one SCA power transmission unit responsive to at least one brake pressure signal.

3. The brake system of claim 2, wherein the second electronic control unit controls at least an other one of the normally open iso valves.

4. The brake system of claim 1, wherein the brake pedal is configured to provide a braking signal, in a wired or wireless manner, corresponding to a desired braking action by an operator of the vehicle, wherein the electronic control unit controls at least one of the SCA power transmission unit and the at least one normally open iso valve responsive to the braking signal.

5. The brake system of claim 1, wherein the master cylinder includes first and second MC chambers and corresponding first and second MC plungers configured for reciprocal motion therein, the first and second MC chambers each providing pressurized hydraulic fluid at a corresponding first or second MC output.

6. The brake system of claim 5, wherein the first and second MC plungers each have substantially the same outer circumference size.

7. The brake system of claim 6, wherein the outer circumference of each of the first and second MC plungers includes a sealing groove, the sealing groove including a resilient sealing member for preventing fluid flow therepast when the resilient sealing member is in contact with an inner wall of an MC housing, the resilient sealing member having a cross-sectional shape which is at least one of curved, ovoid, and circular.

8. The brake system of claim 1, including third and fourth wheel brakes, each of the third and fourth wheel brakes being actuated by at least one of an electric brake motor and a single corner actuator.

9. The brake system of claim 1, wherein each of the single corner actuators is carried by a respective SCA housing, the reservoir and master cylinder are collectively carried by a primary housing, and the primary housing and each SCA housing are all spaced mutually apart from one another.

10. A brake system for actuating a plurality of wheel brakes comprising at least first and second wheel brakes, the brake system comprising:

a reservoir;

a master cylinder in fluid communication with the reservoir and operable during backup braking mode to generate pressurized hydraulic fluid at first and second MC outputs for hydraulically actuating the first and second wheel brakes, respectively, responsive to user manipulation of a brake pedal mechanically connected to the master cylinder, the master cylinder being a dual chamber type master cylinder;

a brake simulator in fluid communication with at least a selected one of the first and second MC outputs and with the reservoir for providing predetermined brake pedal response to the user;

a plurality of single corner actuators, each single corner actuator being hydraulically interposed between a selected one of the first and second MC outputs and a corresponding one of the first and second wheel brakes, each single corner actuator including a SCA power transmission unit configured for selectively providing pressurized hydraulic fluid at an SCA output for actuating the respective wheel brake in at least one of a normal non-failure braking mode and a backup braking mode, the SCA power transmission unit including an electric PTU motor configured to selectively pressurize the hydraulic fluid by transmitting rotary motion to a plunger assembly of the SCA power transmission unit;

at least one two-position three-way valve interposed hydraulically between the plunger assembly and the respective wheel brake for selectively controlling provision of hydraulic fluid to the respective wheel brake from at least one of the plunger assembly and the master cylinder; and a check valve interposed hydraulically between the respective first or second MC output and the SCA power transmission unit, a cracking pressure of the check valve permitting pressure release from the SCA power transmission unit due to a predetermined amount of thermal expansion; and an electronic control unit for controlling at least one of the three-way valves and the at least one SCA power transmission unit responsive to at least one brake pressure signal;

wherein each single corner actuator is indirectly fluidly connected to the reservoir via the master cylinder.

11. The brake system of claim 10, wherein each brake pressure sensor is located directly adjacent a corresponding wheel brake for sensing hydraulic pressure at the corresponding wheel brake and responsively producing the brake pressure signal.

12. The brake system of claim 10, wherein the electronic control unit is a first electronic control unit controlling at least a selected one of the three-way valves and the brake system includes a second electronic control unit controlling the at least one SCA power transmission unit, wherein both the first and second electronic control units control the respective three-way valve and the at least one SCA power transmission unit responsive to at least one brake pressure signal.

13. The brake system of claim 10, wherein the brake pedal is configured to provide a braking signal, in a wired or wireless manner, corresponding to a desired braking action by an operator of the vehicle, wherein the electronic control unit controls at least one of the three-way valves and the motor-driven master cylinder responsive to the braking signal.

14. The brake system of claim 10, wherein the master cylinder includes first and second MC chambers and corresponding first and second MC plungers configured for reciprocal motion therein, the first and second MC chambers each providing pressurized hydraulic fluid at a corresponding first or second MC output.

15. The brake system of claim 14, wherein the first and second MC plungers each have substantially the same outer circumference size.

16. The brake system of claim 15, wherein the outer circumference of each of the first and second MC plungers includes a sealing groove, the sealing groove including a resilient sealing member for preventing fluid flow therepast when the resilient sealing member is in contact with an inner wall of an MC housing, the resilient sealing member having a cross-sectional shape which is at least one of curved, ovoid, and circular.

17. The brake system of claim 10, including third and fourth wheel brakes, each of the third and fourth wheel brakes being actuated by at least one of an electric brake motor and a single corner actuator.

18. The brake system of claim 10, wherein each of the single corner actuators is carried by a respective SCA housing, the reservoir and master cylinder are collectively carried by a primary housing, and the primary housing and each SCA housing are all spaced mutually apart from one another.

19. The brake system of claim 10, wherein each two-position three-way valve is operative to switch a source of pressurized fluid for the corresponding wheel brake from the corresponding single corner actuator to the corresponding first or second MC output responsive to a loss of electrical power in the brake system.

20. The brake system of claim 10, wherein a simulator check valve is interposed hydraulically between the master cylinder and the selected one of the first and second MC outputs which is associated with the brake simulator, the simulator check valve being operative to control flow of pressurized fluid between two or more of the brake simulator, the master cylinder, and a corresponding one of the single corner actuators responsive to pressure in the selected one of the firsts and second MC outputs being at least equal to a predetermined simulator check cracking pressure of the simulator check valve.

21. The brake system of claim 1, wherein the check valve only permits flow from the SCA power transmission unit to the master cylinder.

22. The brake system of claim 1, wherein each single corner actuator is only indirectly fluidly connected to the reservoir via the master cylinder.

23. The brake system of claim 10, wherein the check valve only permits flow from the SCA power transmission unit to the master cylinder.

24. The brake system of claim 10, wherein each single corner actuator is only indirectly fluidly connected to the reservoir via the master cylinder.

* * * * *